(12) United States Patent
Lai et al.

(10) Patent No.: US 10,983,589 B2
(45) Date of Patent: Apr. 20, 2021

(54) SYSTEMS AND METHODS FOR COLLISION AVOIDANCE IN VIRTUAL ENVIRONMENTS

(71) Applicant: MassVR, LLC, Schiller Park, IL (US)

(72) Inventors: Chris Lai, Northbrook, IL (US); Steven Daniels, Chicago, IL (US); Cole Coats, Winfield, IL (US); Peter Rakhunov, Chicago, IL (US); Konrad Ogar, Elmwood Park, IL (US); Joseph Bretz, Chicago, IL (US)

(73) Assignee: MassVR, LLC, Skokie, IL (US)

( * ) Notice: Subject to any disclaimer, the term of this patent is extended or adjusted under 35 U.S.C. 154(b) by 0 days.

(21) Appl. No.: 16/254,231

(22) Filed: Jan. 22, 2019

(65) Prior Publication Data

US 2019/0227312 A1    Jul. 25, 2019

Related U.S. Application Data

(60) Provisional application No. 62/620,260, filed on Jan. 22, 2018.

(51) Int. Cl.
| | | |
|---|---|---|
| G06F 3/01 | (2006.01) | |
| G02B 27/01 | (2006.01) | |
| G08B 7/06 | (2006.01) | |
| G06K 9/00 | (2006.01) | |
| G06T 19/20 | (2011.01) | |

(52) U.S. Cl.
CPC ............ *G06F 3/011* (2013.01); *G02B 27/017* (2013.01); *G06K 9/00671* (2013.01); *G08B 7/06* (2013.01); *G02B 2027/014* (2013.01); *G02B 2027/0138* (2013.01); *G06T 19/20* (2013.01); *G06T 2210/21* (2013.01)

(58) Field of Classification Search
CPC ...... G06K 9/00671; G08B 7/06; G08B 21/02; G02B 27/017; G02B 27/0172; G02B 27/0093; G02B 2027/0138; G02B 2027/014; G02B 2027/0178; G06T 19/006; G06T 19/20; G06T 2210/21; G06F 3/011
USPC ........................................................ 345/7, 8
See application file for complete search history.

(56) References Cited

U.S. PATENT DOCUMENTS

| | | | | |
|---|---|---|---|---|
| 8,898,574 B2* | 11/2014 | Hamilton, II | ........... | H04L 67/38 715/748 |
| 9,003,304 B2* | 4/2015 | Hamilton, II | ........... | G06T 15/20 715/757 |
| 9,311,742 B1* | 4/2016 | Glover | .................. | G06T 19/003 |

(Continued)

*Primary Examiner* — Jason M Mandeville
(74) *Attorney, Agent, or Firm* — K&L Gates LLP

(57) ABSTRACT

Systems and methods of assisting users in collision avoidance in a virtual reality environment include tracking a location, speed, and direction of movement of first and second users in a physical environment; based on the tracked location, speed, and direction of each of the users, calculating a collision probability between the first user and the second user in the physical environment; comparing a threshold collision probability to the calculated collision probability; and when the calculated collision probability exceeds the threshold collision probability and the first user avatar visible to the second user and the second user avatar visible to the first user do not visually suggest to each of the first user and the second user a representation of the probability of collision in the physical environment, a collision alert is triggered.

20 Claims, 4 Drawing Sheets

(56) References Cited

U.S. PATENT DOCUMENTS

| | | | |
|---|---|---|---|
| 2013/0328928 A1* | 12/2013 | Yamagishi | G06F 3/011 |
| | | | 345/633 |
| 2015/0024368 A1* | 1/2015 | King, Jr. | G09B 5/02 |
| | | | 434/365 |
| 2015/0367231 A1* | 12/2015 | Kim | A63F 13/49 |
| | | | 463/31 |
| 2016/0124502 A1* | 5/2016 | Sawyer | G02B 27/017 |
| | | | 345/633 |
| 2017/0282062 A1* | 10/2017 | Black | H04L 67/38 |
| 2018/0090018 A1* | 3/2018 | Gavrilets | G08G 5/045 |
| 2018/0276891 A1* | 9/2018 | Craner | G06T 19/003 |
| 2019/0329136 A1* | 10/2019 | Koyama | A63F 13/577 |

* cited by examiner

SYSTEMS AND METHODS FOR COLLISION AVOIDANCE IN VIRTUAL ENVIRONMENTS

BACKGROUND OF THE INVENTION

The present subject matter relates generally to systems and methods for assisting users in collision avoidance in virtual reality environments. More specifically, the present invention relates to systems and methods in which a virtual reality user is moving within a virtual reality environment that is scaled larger than the user's physical environment.

Virtual reality (VR) systems are digitally rendered environments in which users immerse themselves in a virtual experience. These environments can be modeled after real or imaginary locations. Current technology allows users to explore these environments using a head-mounted display (HMD), often in conjunction with other equipment such as handheld controllers or movement-tracking clothing. HMDs display a virtual environment in front of the user's eyes. The HMDs can take a variety of forms, such as glasses, goggles, helmets etc. Some systems allow users to explore the virtual world by moving through their physical environment, such movement corresponding to and controlling movement in the virtual world. These real and virtual movements are usually limited in scope and range by the environment in which the user is physically located and by the virtual environment the user is exploring.

While a user is immersed in a virtual reality system, the user's HMD typically prevents the user from seeing his or her physical surroundings; this is a tautological requirement of an immersive virtual experience. The isolation of the user from his or her physical surroundings does not always create an issue when the user is stationary, but always poses an issue once the user is mobile.

Augmented reality (AR) offers one solution to this issue by combining the virtual and the real world by overlaying images of virtual objects on the user's display of the physical world. These objects can be viewed through handheld or head-mounted devices; for example, a smartphone app could use the device's camera to display the user's surroundings superimposed with virtual images on the screen. This gives the user awareness of their surroundings while providing extra information through the use of virtual objects. Though AR poses a variety of possibilities, it does not provide the same immersive experience that VR does because it is constrained to working within the constraints of the user's physical location.

One of the major obstacles VR systems face is preventing collisions in multi-user environments. Avatars, or virtual representations of users, are often used within a virtual environment to represent users to each other. For example, if I am interacting with a virtual environment along with two other users, the two other users may appear within my view of the virtual environment as computer generated avatars. Avatars are a straight-forward solution to virtual environments that are limited in scope and scale as a 1:1 ratio with the corresponding physical environment—a user's avatar can be accurately displayed in the user's actual location and appropriate visual cues will be provided to avoid collisions. However, one of the great promises of VR systems is that they do not limit user's experiences in the same way the physical environment does. The less restricted a user is by his or her physical environment, the more complete and immersive the VR environment can be. Accordingly, there is a need for systems and methods for preventing user collisions in virtual reality environments that are larger and/or differently configured than the users' physical environment.

For example, there is a need for systems and methods for preventing user collisions in VR environments that are larger than the users' physical environment. VR environments can be displayed to users as though they are larger than the actual physical environment constraining the users. In VR environments that appear larger than the user's physical environment, there may be instances in which users appear in the VR environment to be spaced further apart than they actually are in the physical environment. This leads to an increased risk of collision in the physical environment.

Similarly, there is a need for systems and methods for preventing user collisions in virtual reality environments that are differently shaped than the users' physical environment. VR environments can be displayed to users in shapes and configurations that do not match identically to the users' physical environment. In VR environments that are differently shaped, there may be instances in which users appear in the VR environment in locations that do not correspond one to one with their locations in the physical space. This also leads to an increased risk of collision in the physical environment as well as with the physical environment.

Similarly, there is a need for systems and methods for preventing user collisions in virtual reality environments that include a greater number of levels (or other elevational manipulations) than the users' physical environment. VR environments can be displayed to users such that a user may appear to be changing in elevational space even when not moving vertically in the physical space. For example, in the VR environment, a user may take an elevator (or escalator, ramp, zipline, etc.) to a "second level" even when the user's elevational position has not changed at all in the physical space. Similarly, the VR environment may display a change in elevation to a user that is riding in a hot air balloon even when the user's elevational position has not changed at all in the physical space. Accordingly, VR environments can be provided in which users occupy distinct elevational levels in the VR environment while occupying a singular elevational space in the physical environment. As such, there may be instances in which users appear in the VR environment in locations that do not correspond one to one with their locations in the physical space, which again leads to an increased risk of collision in the physical environment.

Accordingly, there is a need for systems and methods for assisting users in collision avoidance in virtual reality environments, as described herein.

BRIEF SUMMARY OF THE INVENTION

To meet the needs described above and others, the present disclosure provides systems and methods for collision avoidance in a virtual reality (VR) environment that is not restricted by the users' physical space limitations. The systems and methods are implemented through the design of virtual environments, tracking and displaying user locations in the physical and VR spaces, calculating collision probability, and engaging an alert system when a physical collision is impending.

For purposes of this disclosure, VR systems are understood to be a combination of one or more devices through which a VR environment may be displayed to a user and with which the user may explore and interact. Of particular relevance are multi-user VR environments in which multiple users interact within a single VR environment and, even more relevant, are instances in which multi-user VR environments are provided in which two or more of the users are located within the same physical environment, which puts the users in a position where real life collisions are a risk.

Additionally, the systems and methods provided herein are particularly relevant to VR environments in which the VR environment is different shaped than the physical environment in which the user interacts with the VR environment (e.g., the VR environment is larger, the VR environment includes a greater number of levels, situations in which the real environment includes obstacles that are absent in the VR environment).

These devices used within the VR system may include, but are not limited to, head-mounted displays (HMDs), wearable computing systems, server or cloud-based computing systems, tracking systems (e.g., laser based, camera based, etc.), motion controllers, handheld controllers, and any other such device that aids in user tracking and virtual immersion, as will be recognized by one having ordinary skill in the art with respect to the subject matter presented herein.

VR environments can be constructed to match, on a one to one basis, the physical environment in which the user will be located when interacting with the VR environment (dimensions, elevations, etc.). However, VR environments can get even more interesting when they are unbound by the limitations of the users' physical spaces. When X, Y, and Z offsets are implemented within a VR environment (i.e., the user's position in the VR space is offset from the user's position in the user's physical space in any one or more of the X, Y, or Z axis), the size of the VR environment can be unbound.

A virtual offset area within a VR environment may typically correspond to a designated origin location within the corresponding physical space. As users explore each virtual offset, their locations align with corresponding physical locations in their physical environment. Because of the offset, it is possible for one physical location to correspond to more than one VR location. This is not a problem when users are occupying different VR locations as well as different physical locations (i.e., they will not collide because they are not in the same physical location.) It is not a particularly difficult condition to address when multiple users attempt to occupy the same VR location because they can see the collision coming in the VR environment which enables them to avoid the collision in the corresponding physical environment. However, there may be times in which two users attempt to occupy the same physical location while exploring distinct locations within the VR environment (e.g., when the same physical location is used for users on different levels of the VR environment).

For example, as noted above, users' VR locations are typically represented in the VR environment using avatars, which mimic the movements of the users and are typically updated in real-time. As further noted, using X, Y, and/or Z offsets, multiple users may approach the same physical location without being aware of the other users' physical locations because each user is immersed in the VR environment and each of their avatars are located in different X, Y, and/or Z offsets within the VR environment. This is precisely the problem the present subject matter addresses.

In order to address these potential collisions, it is useful to track the users' location in the physical environment while mapping their locations in the VR environment. Tracking users can be accomplished through any variety of established or original methods.

Using the tracked physical locations of each user, combined with each user's speed and direction, collision probabilities for each pair of users are calculated as each user moves through the physical space. The collision probabilities are used in an alert mechanism. When a collision is deemed likely, and the users are unlikely to recognize the danger within the VR environment, an alert system is triggered. Conversely, when a collision is deemed likely, but the users are likely to recognize the danger within the VR environment, the alert system is not triggered. The parameters used to determine likelihood of collision and the thresholds for triggering alerts may be user or system controllable variables.

In one example, if a collision is imminent, but the avatars of the users are logically visible within each other's view within the VR environment, the alert system is not triggered because the users are likely to recognize the danger and the alert may detract from the immersive nature of the VR experience. However, if the avatar of an approaching user is not visible, and a collision is imminent, the alert system is engaged to decrease the risk of collision between the users.

The alert system may be tuned to the velocity of the users. At higher velocities, an alert may be triggered at a greater distance between users to allow for a reasonable response time given the user's speed. At lower velocities, an alert may not be signaled until the users are within a closer proximity.

The alert system may use visual (e.g., modified avatars, text, or lighting in the VR environment), audio (e.g., cautionary announcements or warning sounds), and/or physical cues (e.g., vibration in the HMD, an associated wearable, or other object associated with the user, such as a handheld tool). The alerts may be variable in intensity (e.g., increasing intensity as the risk of collision increases) or may be simply binary (i.e., on/off). In addition, the alerts may be positioned within space to identify the direction of the danger. For example, an image, sound, or vibration to the user's left may indicate the danger is to the user's left.

In one example, the Z-axis offset may enable two or more users to occupy the same physical location while occupying distinct VR locations. For example, each user may be located in a different elevational level of the VR environment (e.g., a first user is on the ground floor and a second user is directly above the first user on the second floor). If the VR environments is, for example, a multilevel enclosed building, and the only representation of each user is an avatar representing the location of the user within the VR environment, the users would not be able to see each other in the VR environment, even if they were about to collide in the physical environment. Accordingly, a visual alert, such as a ghosted avatar may be used to signal to each user the relative position of the other user(s). A ghosted avatar may be a variation of the primary avatar, but shown with a greater level of transparency, a lower level of color saturation, or some other visual characteristic that distinguishes the ghosted avatar from the primary avatar. In some examples, the ghosted avatar may grow increasingly visible as the probability of a collision between the users increases. In addition, a ghosted avatar may be combined with other alerts to further decrease the risk of collision between users.

In some examples of the subject matter provided herein, systems and methods of assisting users in collision avoidance in a virtual reality environment may include: a first user virtual reality device; a second user virtual reality device; a user location tracking system; a processor in communication with each of the first user virtual reality device, the second user virtual reality device, and the user location tracking system; and a memory in communication with the processor, the memory storing program instructions that, when executed by the processor, cause the processor to: present to each of the first user virtual reality device and the second user virtual reality device a virtual reality environment that uses at least X, Y, or Z-axis offsets to unbind the scope of the virtual reality environment from an associated physical environment such that two user's occupying a single location within the physical environment may occupy two distinct locations within the virtual reality environment; provide a first user avatar visible to the second user in the virtual reality environment via the second user virtual reality device when the relative positions of the first user and the second user within the virtual reality environment suggest visual contact; provide a second user avatar visible to the first user in the virtual reality environment via the first user virtual reality device when the relative positions of the first user and the second user within the virtual reality environment suggest visual contact; track a location, speed, and direction of movement of the first user in the physical environment via the user location tracking system; track a location, speed, and direction of movement of the second user in the physical environment via the user location tracking system; based on the tracked location, speed, and direction of each of the first user and the second user, calculate a collision probability between the first user and the second user in the physical environment; compare a threshold collision probability to the calculated collision probability; when the calculated collision probability exceeds the threshold collision probability and the first user avatar visible to the second user and the second user avatar visible to the first user visually suggest to each of the first user and the second user a representation of the probability of collision in the physical environment, the collision alert is not triggered; and when the calculated collision probability exceeds the threshold collision probability and the first user avatar visible to the second user and the second user avatar visible to the first user do not visually suggest to each of the first user and the second user a representation of the probability of collision in the physical environment, the collision alert is triggered.

The collision alert may be visual, audible, tactile, or other. Visual collision alerts may be text based, avatar based, a combination of both, or other. For example, a visual collision alert may include a supplemental avatar, such as a ghost avatar. An example of a tactile collision alert is a vibration based alert. For example, a vibration may be provided through a head-mounted display. The virtual reality devices may be head-mounted displays or other similar devices.

In some examples, visual cues outside of the VR display, but within the user's field of vision may be used as collision alerts. For example, in a typical head-mounted display (HMD), the VR display covers an approximately 90-110 degree field of view. However, the typical human can see a field of view between approximately 200-220 degrees. Accordingly, within a typical HMD, there is a significant unused portion of the user's field of view. This unused field of view can be used as part of the collision alert system. For example, any portion of unused field of view may include one or more lights, for example, LEDs, that can be used as visual collision alerts. The lights may indicate a direction in which the risk of collision is increasing. The lights may vary in intensity and/or color to signal an increasing risk of collision.

For example, the earliest warning at the lowest level of risk may include a single green light signaling at a relatively low intensity outside of the VR display, but within the user's field of view on the side of the HMD corresponding to the collision risk. As the risk increases, the color may shift from green to yellow and the intensity may increase, either by increasing the output of the LEDs or by increasing the number of active LEDs. Then, as the collision risk becomes critical, the color may shift from yellow to red and the intensity may increase further. These functions can be performed by multiple single-color LEDs or by one or more multicolor LEDs, as will be recognized by those skilled in the art based on the descriptions herein. Further, the increasing risk may be signaled with a single color by varying intensity or by multiple colors with a stable intensity. In other examples, increasing risk may be signaled by an increasing rate of flashing of one or more LEDs. Any visual signaling mechanism that utilizes the space within the HMD that is outside of the VR display and within the user's field of vision may be used for the collision alert system.

In some examples, the X-axis offset enables the first user and the second user to occupy different levels within the virtual reality environment when occupying the same physical location within the physical environment. In other examples, the Y-axis, Z-axis, or a combination of the X, Y, and Z-axis offsets enable the first user and the second user to occupy different levels within the virtual reality environment when occupying the same physical location within the physical environment.

An object of the invention is to provide a solution to decrease the risk of collisions between users in a multi-user VR environment that uses X, Y, and/or Z-axis offsets to break the one-to-one ratio between the VR environment and the physical environment through which the users move.

Another object of the invention is to provide collision warnings that are minimally invasive to and minimally distracting from the VR experience.

Another object of the invention is to promote a greater sense of security to the user to foster the user's ability to immerse himself or herself in the VR experience.

An advantage of the solutions provided herein is that they enable the safe expansion of the VR environment beyond the limits of the users' physical environment.

Another advantage of the solutions provided herein is that they are effective while being minimally invasive to the VR experience.

Another advantage of the solutions provided herein is that using the space in the HMD that is within the user's field of view, but outside of the VR display can be significantly more effective and less distracting from the VR experience than a signal that is within the VR display.

Additional objects, advantages, and novel features of the solutions provided herein will be recognized by those skilled in the art based on the following detail description and claims, as well as the accompanying drawings, and/or may be learned by production or operation of the examples provided herein.

BRIEF DESCRIPTION OF THE DRAWINGS

The figures depict one or more embodiments of the subject matter described herein. They are provided as examples only. Within the figures, reference numbers are used to refer to elements described in the detailed description.

DETAILED DESCRIPTION OF THE INVENTION

Figure 1:
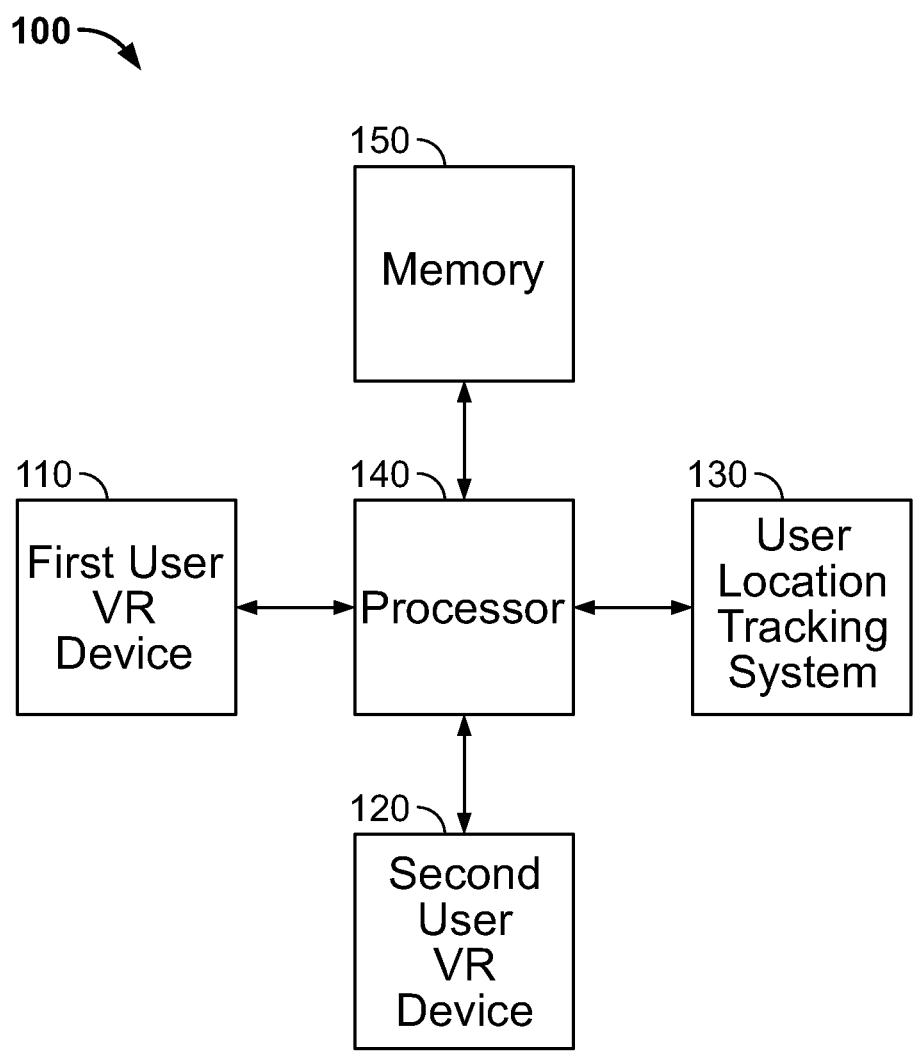
FIG. 1 is a schematic diagram illustrating examples of components of a system for assisting users in collision avoidance in virtual reality environments.

FIG. 1 illustrates a system 100 for assisting users in collision avoidance in virtual reality environments. Specifically, the system 100 is particularly useful in assisting users in unbound, multi-user, VR environments, i.e., multi-user VR environments that do not correspond one-to-one with the physical environment in which the users operate. In principle embodiments, the system 100 provides alerts to users in situations in which they may collide in the real environment, but otherwise would not have seen each other in the virtual environment.

In the embodiment illustrated in FIG. 1, the system 100 includes: a first user virtual reality device 110 (e.g., an HMD); a second user virtual reality device 120 (e.g., an HMD); a user location tracking system 130 (e.g., an ultra-wideband signal and reflective marker system in which ultra-wideband signal transceivers read the locations of users based on reflections from reflective markers worn or carried by the users); a processor 140 in communication with each of the first user virtual reality device 110, the second user virtual reality device 120, and the user location tracking system 130; and a memory 150 in communication with the processor 140, the memory 150 storing program instructions that, when executed by the processor 140, cause the processor 140 to perform the features and functions described herein.

For example, the processor 140 may present to each of the first user virtual reality device 110 and the second user virtual reality device 120 a virtual reality environment that uses at least X, Y, or Z-axis offsets to unbind the scope of the virtual reality environment from an associated physical environment such that two users occupying a single location within the physical environment may occupy two distinct locations within the virtual reality environment.

The processor 140 may further provide a first user avatar visible to the second user in the virtual reality environment via the second user virtual reality device 120 when the relative positions of the first user and the second user within the virtual reality environment suggests visual contact would exist within the virtual reality environment. The processor 140 may also provide a second user avatar visible to the first user in the virtual reality environment via the first user virtual reality device 110 when the relative positions of the first user and the second user within the virtual reality environment suggest visual contact between the two.

The processor 140 may also track a location, speed, and direction of movement of the first user and the second user in the physical environment via the user location tracking system 130. Then, based on the tracked location, speed, and direction of each of the first user and the second user, the processor 140 may calculate a collision probability between the first user and the second user in the physical environment and compare a threshold collision probability to the calculated collision probability. For example, using the speed and direction each user is traveling, the processor 140 may calculate a predicted likelihood of collision between two users. This calculated collision probability may be an instantaneous number, may be a time-averaged number, or may be any other calculated probability, as will be understood by those skilled in the art based on the disclosure provided herein.

Using a system adjustable threshold collision probability as a guideline for when to provide an alert based on the calculated collision probability enables the system 100 to be tailored to meet the end users' preferences. For example, in conservative versions of the system 100, an alert may be provided anytime the calculated collision probability exceeds a low threshold collision probability, such as 0.01 or 0.05. In more aggressive versions of the system 100, an alert may only be provided when the calculated collision probability exceeds a higher threshold collision probability, such as 0.4 or 0.5. The lower the threshold, the greater the risk of interfering with the users' virtual reality experience. The higher the threshold, the greater risk of collision between users in the real environment. These examples are provided merely for purposes of illustration and it is recognized that the threshold collision probability may be adjusted in any manner a system administrator may determine is most desired.

In use, when the calculated collision probability exceeds the threshold collision probability and the first user avatar visible to the second user and the second user avatar visible to the first user visually suggest to each of the first user and the second user a representation of the probability of collision in the physical environment (i.e., the users can see each other's positions and movements in the virtual reality environment), the collision alert is not triggered. Conversely, when the calculated collision probability exceeds the threshold collision probability and the first user avatar visible to the second user and the second user avatar visible to the first user do not visually suggest to each of the first user and the second user a representation of the probability of collision in the physical environment (i.e., the users cannot see each other's positions and movements in the virtual reality environment), the collision alert is triggered.

It is contemplated that there are numerous variables that may go into the determination of whether the users can or cannot see each other's positions and movements in the virtual reality environment. For example, the system 100 may track each user's field of view in a such a manner that if two users are standing back to back, they may each be given an alert of their proximity given that they would not see each other in either the real or virtual reality environment. Obstacles in the virtual reality environment may be accounted for. Certainly, elevational position within the virtual reality environment is a primary consideration. Those skilled in the art will understand the range of variables that affect visibility of a likelihood of collision in the virtual reality environment based on the teachings provided herein.

Figure 2:
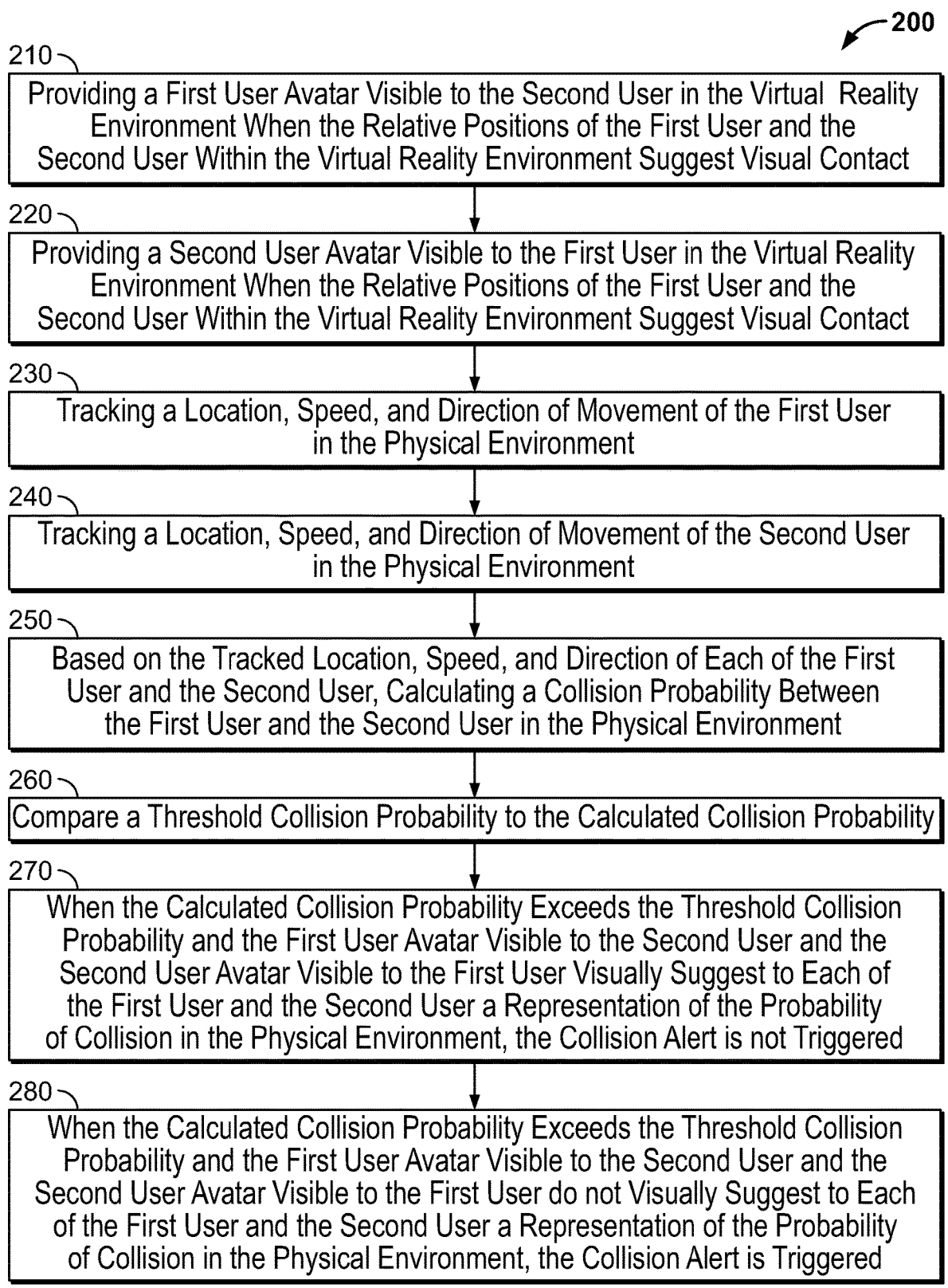
FIG. 2 is flow chart representing an example of a method for assisting users in collision avoidance in virtual reality environments.

FIG. 2 is a flow chart representing an example of a method 200 for assisting users in collision avoidance in virtual reality environments. In the example shown in FIG. 2, the virtual reality environment uses at least X, Y, or Z-axis offsets to unbind the scope of the virtual reality environment from an associated physical environment such that two users occupying a single location within the physical environment may occupy two distinct locations within the virtual reality environment. Also, in this example, a first user virtual reality device at least partially obscures a first user's perception of a second user and a second user virtual reality device at least partially obscures a second user's perception of the first user. This creates a condition in which the two users are at risk for colliding in the real-world physical environment.

As shown in FIG. 2, the method 200 may include the steps of:

Step 210: providing a first user avatar visible to the second user in the virtual reality environment when the relative positions of the first user and the second user within the virtual reality environment suggest visual contact.

Step 220: providing a second user avatar visible to the first user in the virtual reality environment when the relative positions of the first user and the second user within the virtual reality environment suggest visual contact.

Step 230: tracking a location, speed, and direction of movement of the first user in the physical environment.

Step 240: tracking a location, speed, and direction of movement of the second user in the physical environment.

Step 250: based on the tracked location, speed, and direction of each of the first user and the second user, calculating a collision probability between the first user and the second user in the physical environment.

Step 260: compare a threshold collision probability to the calculated collision probability.

Step 270: when the calculated collision probability exceeds the threshold collision probability and the first user avatar visible to the second user and the second user avatar visible to the first user visually suggest to each of the first user and the second user a representation of the probability of collision in the physical environment, the collision alert is not triggered.

Step 280: when the calculated collision probability exceeds the threshold collision probability and the first user avatar visible to the second user and the second user avatar visible to the first user do not visually suggest to each of the first user and the second user a representation of the probability of collision in the physical environment, the collision alert is triggered.

Figure 3:
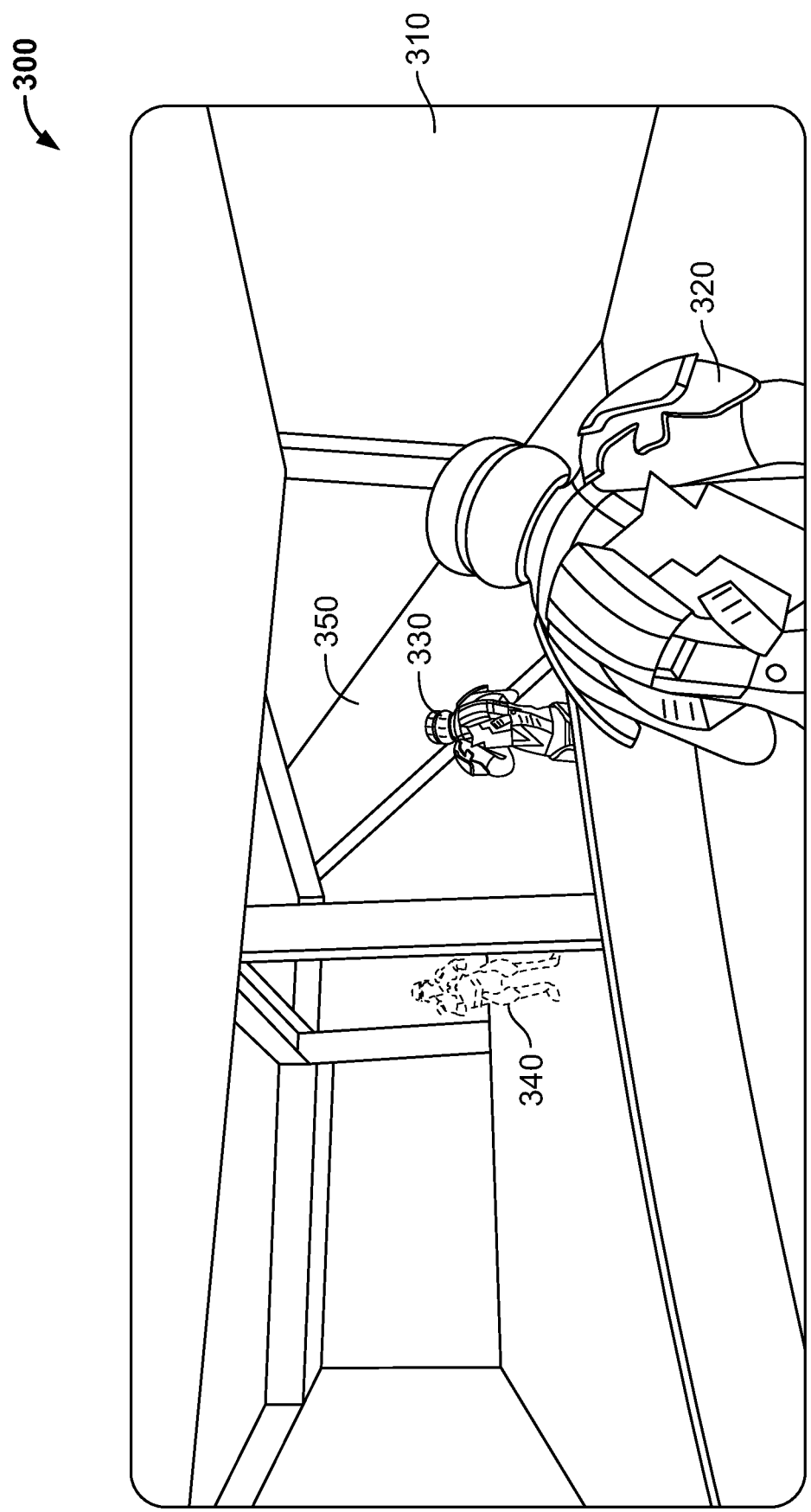
FIG. 3 is an example of a VR display in which a ghosted avatar indicates an increasing risk of collision with another user.
Figure 4:
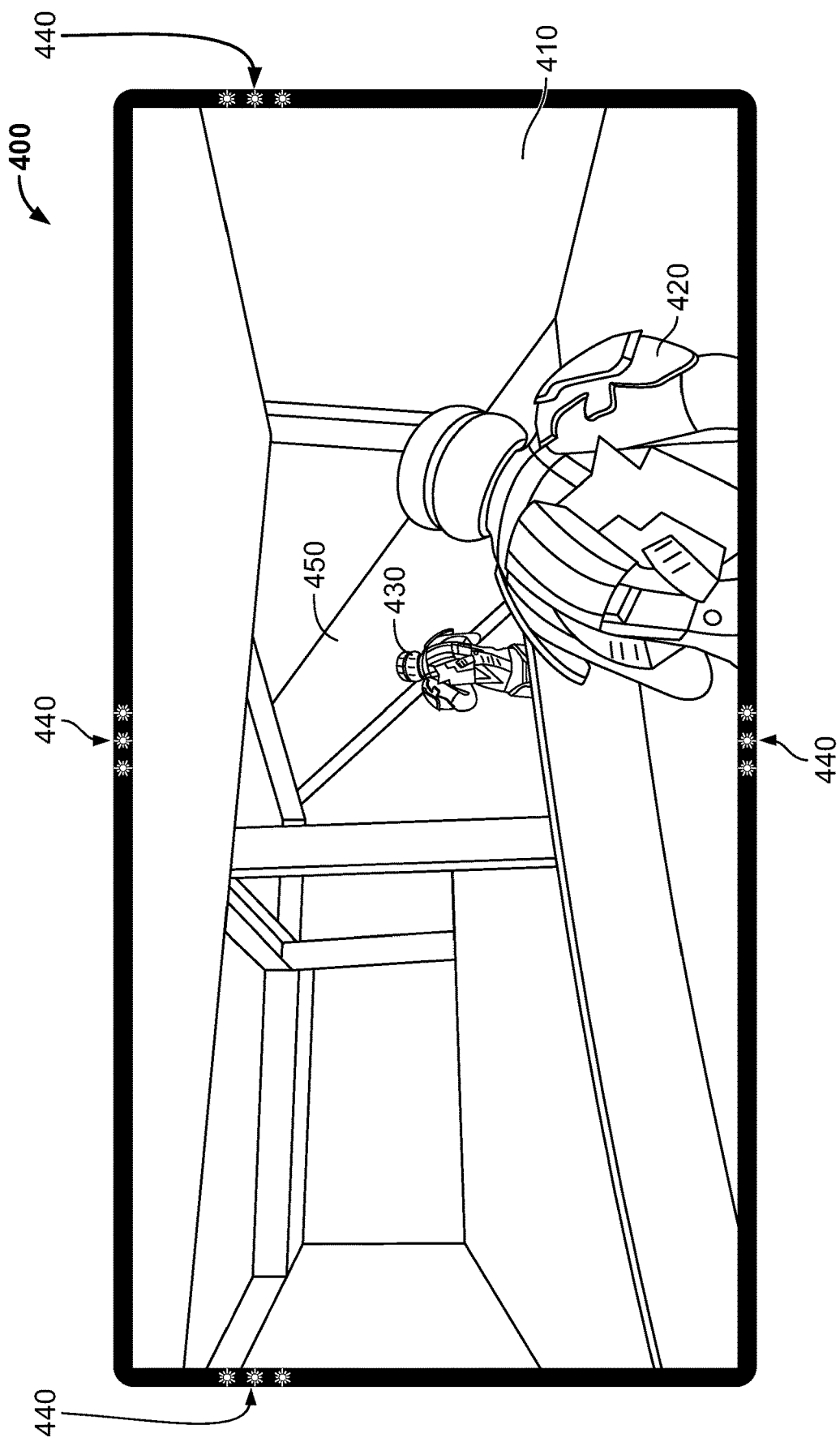
FIG. 4 is an example of a VR display in which a light-based warning system indicates an increasing risk of collision with another user.

The collision alert may take any of numerous forms. For example, the alert may be a sound, a sensation (e.g., a vibration or other haptic response), a visual representation or effect, a text-based signal, etc. The collision alert may be provided through the user's virtual reality device, whether a head-mounted display, a wearable, a holdable, etc. For example, the collision alert may be provided through sounds or lights in the head-mounted display. The collision alert may be provided a vibration unit within the virtual reality device, such as a user carried tool. FIGS. 3 and 4 provide examples of such collision alerts.

FIG. 3 is an example of a display 300 depicting a virtual reality environment 310 to a user. The display 300 may be part of a head-mounted display or similar first user virtual reality device 110. Within the display 300 a first user's avatar 320 is shown from a third-person perspective. In addition, a second user's avatar 330 and a third user's avatar 340 are shown.

As shown in FIG. 3, the second user's avatar 330 is rendered with the same level of detail as the first user's avatar 320, indicating the position of the second user's avatar 330 accurately reflects the second user's position within the real environment. Therefore, the first user can rely on the position and movement of the second user's avatar 330 to appropriately assess the risk of collision.

As further shown in FIG. 3, the third user's avatar 340 is rendered with a reduced level of detail (i.e., ghosted) compared to each of the first user's avatar 320 and the second user's avatar 330. In this example, the ghosted version of the third user's avatar 340 communicates to the first user the position and movement of the third user in the real environment despite the non-ghosted version of the third user's avatar 340 not being seen by the first user. For example, the third user may have "ascended" the ramp 350 in the virtual reality environment 310 to a second level such that neither the first user or second user would see the third user, but the ghosted version of the third user's avatar 340 is provided to help avoid a collision between any of the three users.

FIG. 4 is an example of a display 400 depicting a virtual reality environment 410 to a user. The display 400 may be part of a head-mounted display or similar first user virtual reality device 110. Within the display 400 a first user's avatar 420 is shown from a third-person perspective. In addition, a second user's avatar 430 is shown.

As shown in FIG. 4, the second user's avatar 330 is in view of the first user. Therefore, the first user can rely on the position and movement of the second user's avatar 330 to appropriately assess the risk of collision.

As further shown in FIG. 4, a ramp 450 is shown in the in the virtual reality environment 410 and one or more users may have used the ramp 450 to ascend to a second level in the virtual reality environment 410. Because these additional users would not be in view to the first user, the first user virtual reality device 110 includes a series of lights 440 surrounding the display 400 on each of the four sides. These lights can be used to indicate a likelihood of collision with an unseen user, as well as indicate the direction in which that collision may occur.

For example, if a third user has ascended the ramp 450 and is located above the first user in the virtual environment 410, the first user will not be able to see the third user in the virtual reality environment 410. However, if the third user is located approximately above the first user in the virtual reality environment 410, the two users may collide in the real environment. Accordingly, in the example shown in FIG. 4, the lights 440 may activate to indicate the risk of a collision. If the third user is located to the right of the first user in the real environment, the lights 440 on the right side of the display 400 may activate. If the third user is located behind the first user in the real environment, the lights 440 on the bottom side of the display 400 may activate. If the third user is located to the left of the first user in the real environment, the lights 440 on the left side of the display 400 may activate. If the third user is located in front of the first user in the real environment, the lights 440 on the top side of the display 400 may activate. The lights 440 may activate by illuminating, by changing color, by increasing in intensity, or in any other manner that visually signals to the user a risk of collision. Also, using combinations of multiple pairs of lights 440, the first user virtual reality device 110 can indicate when a potential collision is at an angle to the first user. For example, if the back and left lights 440 activated, the first user may be aware of a potential collision behind the first user of the first user's left shoulder.

As will be understood by those skilled in the art, in another example, the lights 440 shown in FIG. 4 may be supplemented by, or substituted for, audio or haptic cues in the first user virtual reality device 110. For example, when the lights 440 activate and increase in intensity on the right side of the display 400, the first user virtual reality device 110 may also provide a sound that increases in intensity and/or vibration that increases in intensity in the direction of the potential collision. Such alerts may be further supplemented, or replaced, by a text warning on the display 400.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A method of assisting users in collision avoidance in a virtual reality environment in which a first user virtual reality device at least partially obscures a first user's perception of a second user and a second user virtual reality device at least partially obscures a second user's perception of the first user, the method comprising the steps of:

providing a user location tracking system that tracks at least a first user's physical location and a second user's physical location within a physical environment associated with a first user's virtual location and a second user's virtual location within the virtual reality environment, wherein the virtual reality environment uses X, Y, or Z-axis offsets to unbind the scope of the virtual reality environment from the associated physical environment, wherein the size of the virtual reality environment is larger than the associated physical environment in at least one of the X, Y, or Z axes, wherein the X, Y, or Z-axis offsets that unbind the scope of the virtual reality environment from the associated physical environment include at least a first designated origin location that corresponds to a single X, Y, and Z location in the associated physical environment and corresponds to two or more X, Y, and Z locations in the virtual reality environment;

when one of the first user or the second user moves to the first designated origin location in the physical environment, moving the corresponding first user or second user from a first X, Y, and Z location in the virtual reality environment to a second X, Y, and Z location in the virtual reality environment that is offset from the first X, Y, and Z location in the virtual reality environment in one or more of the X, Y, or Z axes altering an initial relationship between the first user's physical location and the first user's virtual location compared to the second user's physical location and the second user's virtual location to an altered relationship between the first user's physical location and the first user's virtual location compared to the second user's physical location and the second user's virtual location, such that when the first user and the second user occupy a single X, Y, and Z location within the physical environment, such that the first user and the second user physically collide, the first user and the second user may occupy two distinct X, Y, and Z locations within the virtual reality environment;

providing on the second user virtual reality device a first user avatar visible to the second user in the virtual reality environment when the X, Y, and Z location and a relative position of the first user and the X, Y, and Z location and a relative position of the second user within the virtual reality environment suggest visual contact would exist within the virtual reality environment between the second user and the first user;

providing on the first user virtual reality device a second user avatar visible to the first user in the virtual reality environment when the X, Y, and Z location and the relative position of the first user and the X, Y, and Z location and the relative position second user within the virtual reality environment suggest visual contact would exist within the virtual reality environment between the first user and the second user;

tracking a location, speed, and direction of movement of the first user in the physical environment;

tracking a location, speed, and direction of movement of the second user in the physical environment;

based on the tracked location, speed, and direction of each of the first user and the second user, calculating a collision probability between the first user and the second user in the physical environment;

compare a threshold collision probability to the calculated collision probability;

when the calculated collision probability exceeds the threshold collision probability and the X, Y, and Z location, the relative position, and a movement of the first user avatar visible to the second user and the X, Y, and Z location, the relative position, and a movement of the second user avatar visible to the first user visually suggest to each of the first user and the second user a representation of the probability of collision in the physical environment, a collision alert is not triggered; and when the calculated collision probability exceeds the threshold collision probability and the X, Y, and Z location, the relative position, and/or the movement of the first user avatar visible to the second user and the X, Y, and Z location, the relative position, and/or the movement of the second user avatar visible to the first user do not visually suggest to each of the first user and the second user a representation of the probability of collision in the physical environment, the collision alert is triggered.

2. The method of claim 1 wherein the collision alert is visual.

3. The method of claim 2 wherein the visual collision alert is text based.

4. The method of claim 2 wherein the visual collision alert comprises a supplemental avatar.

5. The method of claim 4 wherein the supplemental avatar is a ghosted version of an avatar.

6. The method of claim 1 wherein the collision alert is audible.

7. The method of claim 1 wherein the collision alert is tactile.

8. The method of claim 7 wherein the tactile collision alert is vibration based.

9. The method of claim 1 wherein the first user virtual reality device is a head-mounted display.

10. The method of claim 1 wherein the Z-axis offset enables the first user and the second user to occupy different levels within the virtual reality environment when occupying the same physical location within the physical environment.

11. A system of assisting users in collision avoidance in a virtual reality environment comprising:

a first user virtual reality device at least partially obscuring a first user's perception of a second user;

a second user virtual reality device at least partially obscuring a second user's perception of the first user;

a user location tracking system that tracks at least a first user's physical location and a second user's physical location within a physical environment associated with a first user's virtual location and a second user's virtual location within the virtual reality environment, wherein the virtual reality environment uses X, Y, or Z-axis offsets to unbind the scope of the virtual reality environment from the associated physical environment, wherein the size of the virtual reality environment is larger than the associated physical environment in at least one of the X, Y, or Z axes, wherein the X, Y, or Z-axis offsets that unbind the scope of the virtual reality environment from the associated physical environment include at least a first designated origin location that corresponds to a single X, Y, and Z location in the associated physical environment and corresponds to two or more X, Y, and Z locations in the virtual reality environment;

a processor in communication with each of the first user virtual reality device, the second user virtual reality device, and the user location tracking system; and a memory in communication with the processor, the memory storing program instructions that, when executed by the processor, cause the processor to:

present to each of the first user virtual reality device and the second user virtual reality device the virtual reality environment in which, when one of the first user or the second user moves to the first designated origin location in the physical environment, the corresponding first user or second user moves from a first X, Y, and Z location in the virtual reality environment to a second X, Y, and Z location in the virtual reality environment that is offset from the first X, Y, and Z location in the virtual reality environment in one or more of the X, Y, or Z axes altering an initial relationship between the first user's physical location and the first user's virtual location compared to the second user's physical location and the second user's virtual location to an altered relationship between the first user's physical location and the first user's virtual location compared to the second user's physical location and the second user's virtual location, such that when the first user and the second user occupy a single X, Y, and Z location within the physical environment, such that the first user and the second user physically collide, the first user and the second user may occupy two distinct X, Y, and Z locations within the virtual reality environment;

provide a first user avatar visible to the second user in the virtual reality environment via the second user virtual reality device when the X Y, and Z location and a relative position of the first user and the X, Y, and Z location and a relative position of the second user within the virtual reality environment suggest visual contact would exist within the virtual reality environment between the second user and the first user;

provide a second user avatar visible to the first user in the virtual reality environment via the first user virtual reality device when the X, Y, and Z location and the relative position of the first user and the X, Y, and Z location and the relative position second user within the virtual reality environment suggest visual contact would exist within the virtual reality environment between the first user and the second user;

track a location, speed, and direction of movement of the first user in the physical environment via the user location tracking system;

track a location, speed, and direction of movement of the second user in the physical environment via the user location tracking system;

based on the tracked location, speed, and direction of each of the first user and the second user, calculate a collision probability between the first user and the second user in the physical environment;

compare a threshold collision probability to the calculated collision probability;

when the calculated collision probability exceeds the threshold collision probability and the X, Y, and Z location, the relative position, and a movement of the first user avatar visible to the second user and the X, Y, and Z location, the relative position, and a movement of the second user avatar visible to the first user visually suggest to each of the first user and the second user a representation of the probability of collision in the physical environment, a collision alert is not triggered; and when the calculated collision probability exceeds the threshold collision probability and the X, Y, and Z location, the relative position, and/or the movement of the first user avatar visible to the second user and the X, Y, and Z location, the relative position, and/or the movement of the second user avatar visible to the first user do not visually suggest to each of the first user and the second user a representation of the probability of collision in the physical environment, the collision alert is triggered.

12. The system of claim 11 wherein the collision alert is visual.

13. The system of claim 12 wherein the visual collision alert is text based.

14. The system of claim 12 wherein the visual collision alert comprises a supplemental avatar.

15. The system of claim 12 wherein the visual collision alert comprises signals in an area within a head-mounted display that is within a user's field of view and outside of a virtual reality display area.

16. The system of claim 11 wherein the collision alert is audible.

17. The system of claim 11 wherein the collision alert is tactile.

18. The system of claim 17 wherein the tactile collision alert is vibration based.

19. The system of claim 11 wherein the first user virtual reality device is a head-mounted display.

20. The system of claim 11 wherein the Z-axis offset enables the first user and the second user to occupy different levels within the virtual reality environment when occupying the same physical location within the physical environment.

* * * * *